(12) United States Patent
Zaslavsky et al.

(10) Patent No.: US 9,021,543 B2
(45) Date of Patent: Apr. 28, 2015

(54) HIGHLY SCALABLE AUDIENCE MEASUREMENT SYSTEM WITH CLIENT EVENT PRE-PROCESSING

(75) Inventors: Eduard Zaslavsky, Issaquah, WA (US); Arthur Vaysman, San Jose, CA (US)

(73) Assignee: Webtuner Corporation, Redmond, WA (US)

( * ) Notice: Subject to any disclaimer, the term of this patent is extended or adjusted under 35 U.S.C. 154(b) by 0 days.

(21) Appl. No.: 13/482,127

(22) Filed: May 29, 2012

(65) Prior Publication Data

US 2012/0304210 A1 Nov. 29, 2012

Related U.S. Application Data

(60) Provisional application No. 61/490,259, filed on May 26, 2011.

(51) Int. Cl.

| | |
|---|---|
| *H04N 21/258* | (2011.01) |
| *H04N 21/442* | (2011.01) |
| *H04N 21/658* | (2011.01) |
| *H04N 21/81* | (2011.01) |
| *H04N 21/6437* | (2011.01) |
| *H04H 60/31* | (2008.01) |
| *H04H 60/40* | (2008.01) |

(52) U.S. Cl.
CPC ......... *H04N 21/812* (2013.01); *H04N 21/6437* (2013.01); *H04H 60/31* (2013.01); *H04H 60/40* (2013.01); *H04N 21/25891* (2013.01); *H04N 21/44222* (2013.01); *H04N 21/6582* (2013.01)

(58) Field of Classification Search
None
See application file for complete search history.

(56) References Cited

U.S. PATENT DOCUMENTS

| | | |
|---|---|---|
| 2,958,403 A | 11/1960 | Robertson |
| 4,264,924 A | 4/1981 | Freeman |
| 4,332,998 A | 6/1982 | Boros |
| 4,381,522 A | 4/1983 | Lambert |
| 4,426,629 A | 1/1984 | Fouse |
| 4,529,006 A | 7/1985 | Block et al. |
| 4,561,233 A | 12/1985 | Harter et al. |
| 4,580,950 A | 4/1986 | Sumikawa et al. |
| 4,706,121 A | 11/1987 | Young |
| 4,745,549 A | 5/1988 | Hashimoto |

(Continued)

FOREIGN PATENT DOCUMENTS

| | | |
|---|---|---|
| EP | 0965192 | 12/1999 |
| EP | 1193969 | 4/2002 |

(Continued)

OTHER PUBLICATIONS

PCT Patentability Report for PCT/US2006/003420, dated Apr. 3, 2008.

(Continued)

*Primary Examiner* — Nathan Flynn
*Assistant Examiner* — Omar S Parra
(74) *Attorney, Agent, or Firm* — Remenick PLLC

(57) ABSTRACT

Methods of reporting Audience Measurement System (AMS) viewership events on a client device and systems implementing the method are disclosed. The method comprises the steps of receiving at least one event message on a client device, wherein each event message is a data signal indicating an occurrence of an event, processing the at least one event message on the client device to create an AMS viewership report, and transmitting the AMS viewership report.

16 Claims, 1 Drawing Sheet

(56) References Cited

U.S. PATENT DOCUMENTS

| | | |
|---|---|---|
| 4,751,578 A | 6/1988 | Reiter et al. |
| 4,873,073 A | 10/1989 | Matsui et al. |
| 4,977,455 A | 12/1990 | Young |
| 4,982,343 A | 1/1991 | Hourvitz et al. |
| 4,996,642 A | 2/1991 | Hey |
| 5,047,867 A | 9/1991 | Strubbe et al. |
| 5,151,789 A | 9/1992 | Young |
| 5,161,109 A | 11/1992 | Keating et al. |
| 5,179,439 A | 1/1993 | Hashimoto |
| 5,223,924 A | 6/1993 | Strubbe |
| 5,253,275 A | 10/1993 | Yurt et al. |
| 5,307,173 A | 4/1994 | Yuen et al. |
| 5,323,240 A | 6/1994 | Amano et al. |
| 5,343,665 A | 9/1994 | Palmersten |
| 5,347,632 A | 9/1994 | Filepp et al. |
| 5,351,075 A | 9/1994 | Herz et al. |
| 5,353,121 A | 10/1994 | Young et al. |
| 5,381,523 A | 1/1995 | Hayashi |
| 5,382,779 A | 1/1995 | Gupta |
| 5,410,344 A | 4/1995 | Graves et al. |
| 5,459,826 A | 10/1995 | Archibald |
| 5,483,278 A | 1/1996 | Strubbe et al. |
| 5,534,911 A | 7/1996 | Levitan |
| 5,535,320 A | 7/1996 | Gay et al. |
| 5,541,638 A | 7/1996 | Story |
| 5,541,738 A | 7/1996 | Mankovitz |
| 5,541,991 A | 7/1996 | Benson et al. |
| 5,546,193 A | 8/1996 | Hailey et al. |
| 5,548,708 A | 8/1996 | Sakashita et al. |
| 5,555,496 A | 9/1996 | Tackbary et al. |
| 5,559,549 A | 9/1996 | Hendricks et al. |
| 5,596,373 A | 1/1997 | White et al. |
| 5,600,364 A | 2/1997 | Hendricks et al. |
| 5,608,534 A | 3/1997 | Park et al. |
| 5,635,989 A | 6/1997 | Rothmuller |
| 5,647,181 A | 7/1997 | Hunts |
| 5,649,186 A | 7/1997 | Ferguson |
| 5,649,216 A | 7/1997 | Sieber |
| 5,657,414 A | 8/1997 | Lett et al. |
| 5,680,619 A | 10/1997 | Gudmundson et al. |
| 5,684,525 A | 11/1997 | Klosterman |
| 5,740,425 A | 4/1998 | Povilus |
| 5,748,257 A | 5/1998 | Kawabata et al. |
| 5,748,484 A | 5/1998 | Cannon et al. |
| 5,749,083 A | 5/1998 | Koda et al. |
| 5,761,372 A | 6/1998 | Yoshinobu et al. |
| 5,801,747 A | 9/1998 | Bedard |
| 5,822,014 A | 10/1998 | Steyer et al. |
| 5,822,123 A | 10/1998 | Davis et al. |
| 5,844,620 A | 12/1998 | Coleman et al. |
| 5,860,073 A | 1/1999 | Ferrel et al. |
| 5,861,906 A | 1/1999 | Dunn et al. |
| 5,870,718 A | 2/1999 | Spector |
| 5,872,588 A * | 2/1999 | Aras et al. .................. 725/14 |
| 5,873,073 A | 2/1999 | Bresnan et al. |
| 5,890,175 A | 3/1999 | Wong et al. |
| 5,907,704 A | 5/1999 | Gudmundson et al. |
| 5,926,825 A | 7/1999 | Shirakawa |
| 5,930,810 A | 7/1999 | Farros et al. |
| 5,933,811 A | 8/1999 | Angles et al. |
| 5,948,061 A | 9/1999 | Merriman et al. |
| 5,956,736 A | 9/1999 | Hanson et al. |
| 5,963,968 A | 10/1999 | Warmus et al. |
| 5,973,683 A | 10/1999 | Cragun et al. |
| 5,974,396 A | 10/1999 | Anderson et al. |
| 5,983,227 A | 11/1999 | Nazem et al. |
| 5,983,243 A | 11/1999 | Heiney et al. |
| 5,986,670 A | 11/1999 | Dries et al. |
| 5,987,454 A | 11/1999 | Hobbs |
| 5,999,912 A | 12/1999 | Wodarz et al. |
| 6,005,560 A | 12/1999 | Gill et al. |
| 6,005,597 A | 12/1999 | Barrett et al. |
| 6,009,410 A | 12/1999 | LeMole et al. |
| 6,026,417 A | 2/2000 | Ross et al. |
| 6,034,678 A | 3/2000 | Hoarty et al. |
| 6,035,584 A | 3/2000 | Barreto |
| 6,052,514 A | 4/2000 | Gill et al. |
| 6,064,967 A | 5/2000 | Speicher |
| 6,072,983 A | 6/2000 | Klosterman |
| 6,081,262 A | 6/2000 | Gill et al. |
| 6,085,485 A | 7/2000 | Murdock |
| 6,088,722 A | 7/2000 | Herz et al. |
| 6,094,186 A | 7/2000 | Kuroda et al. |
| 6,097,878 A | 8/2000 | Saib |
| 6,108,673 A | 8/2000 | Brandt et al. |
| 6,118,449 A | 9/2000 | Rosen et al. |
| 6,118,925 A | 9/2000 | Murata et al. |
| 6,119,101 A | 9/2000 | Peckover |
| 6,144,944 A | 11/2000 | Kurtzman, II et al. |
| 6,157,411 A | 12/2000 | Williams et al. |
| 6,167,382 A | 12/2000 | Sparks et al. |
| 6,182,050 B1 | 1/2001 | Ballard |
| 6,192,382 B1 | 2/2001 | Lafer et al. |
| 6,205,582 B1 | 3/2001 | Hoarty |
| 6,216,112 B1 | 4/2001 | Fuller et al. |
| 6,230,143 B1 | 5/2001 | Simons et al. |
| 6,243,375 B1 | 6/2001 | Speicher |
| 6,247,047 B1 | 6/2001 | Wolff |
| 6,253,238 B1 | 6/2001 | Lauder et al. |
| 6,271,860 B1 | 8/2001 | Gross |
| 6,286,005 B1 | 9/2001 | Cannon |
| 6,311,211 B1 | 10/2001 | Shaw et al. |
| 6,312,336 B1 | 11/2001 | Handelman et al. |
| 6,313,822 B1 | 11/2001 | McKay et al. |
| 6,317,883 B2 | 11/2001 | Marics |
| 6,334,109 B1 | 12/2001 | Kanevsky et al. |
| 6,356,903 B1 | 3/2002 | Baxter et al. |
| 6,385,592 B1 | 5/2002 | Angles et al. |
| 6,400,406 B1 | 6/2002 | Kim |
| 6,401,075 B1 | 6/2002 | Mason et al. |
| 6,405,371 B1 | 6/2002 | Oosterhout et al. |
| 6,415,316 B1 | 7/2002 | Van Der Meer |
| 6,425,128 B1 | 7/2002 | Krapf et al. |
| 6,438,752 B1 | 8/2002 | McClard |
| 6,446,045 B1 | 9/2002 | Stone et al. |
| 6,449,657 B2 | 9/2002 | Stanbach, Jr. et al. |
| 6,462,754 B1 | 10/2002 | Chakraborty et al. |
| 6,463,585 B1 | 10/2002 | Hendricks et al. |
| 6,473,794 B1 | 10/2002 | Guheen et al. |
| 6,477,705 B1 | 11/2002 | Yuen et al. |
| 6,484,148 B1 | 11/2002 | Boyd |
| 6,484,149 B1 | 11/2002 | Jammes et al. |
| 6,493,688 B1 | 12/2002 | Das et al. |
| 6,496,857 B1 | 12/2002 | Dustin et al. |
| 6,513,035 B1 | 1/2003 | Tanaka et al. |
| 6,519,571 B1 | 2/2003 | Guheen et al. |
| 6,526,577 B1 | 2/2003 | Knudson et al. |
| 6,538,701 B1 | 3/2003 | Yuen |
| 6,553,178 B2 | 4/2003 | Abecassis |
| 6,567,854 B1 | 5/2003 | Olshansky et al. |
| 6,571,053 B1 | 5/2003 | Yasuzato |
| 6,587,835 B1 | 7/2003 | Treyz et al. |
| 6,589,292 B1 | 7/2003 | Langford-Wilson |
| 6,601,107 B1 | 7/2003 | Seibert |
| 6,604,088 B1 | 8/2003 | Landom et al. |
| 6,604,328 B1 | 8/2003 | Paddock |
| 6,611,348 B1 | 8/2003 | Chase et al. |
| 6,611,349 B1 | 8/2003 | Vogt et al. |
| 6,611,958 B1 | 8/2003 | Shintani et al. |
| 6,618,504 B1 | 9/2003 | Yoshino |
| 6,628,314 B1 | 9/2003 | Hoyle |
| 6,637,029 B1 | 10/2003 | Maissel et al. |
| 6,684,369 B1 | 1/2004 | Bernardo et al. |
| 6,691,093 B2 | 2/2004 | Shell |
| 6,701,060 B2 | 3/2004 | Yuen et al. |
| 6,704,931 B1 | 3/2004 | Schaffer et al. |
| 6,718,551 B1 | 4/2004 | Swix et al. |
| 6,728,966 B1 | 4/2004 | Arsenault et al. |
| 6,738,978 B1 | 5/2004 | Hendricks et al. |
| 6,748,397 B2 | 6/2004 | Choi |
| 6,763,334 B1 | 7/2004 | Matsumoto et al. |
| 6,795,972 B2 | 9/2004 | Rovira |
| 6,799,327 B1 | 9/2004 | Reynolds et al. |
| 6,801,917 B2 | 10/2004 | Gutta et al. |

(56) References Cited

U.S. PATENT DOCUMENTS

| | | |
|---|---|---|
| 6,810,526 B1 | 10/2004 | Menard et al. |
| 6,813,776 B2 | 11/2004 | Chernock et al. |
| 6,829,587 B2 | 12/2004 | Stone et al. |
| 6,829,780 B2 | 12/2004 | Kraft et al. |
| 6,847,969 B1 | 1/2005 | Mathai et al. |
| 6,851,090 B1 | 2/2005 | Gutta et al. |
| 6,889,385 B1 | 5/2005 | Rakib et al. |
| 6,918,132 B2 | 7/2005 | Gargi |
| 6,922,844 B1 | 7/2005 | Arsenault et al. |
| 6,954,728 B1 | 10/2005 | Kusumoto et al. |
| 6,958,759 B2 | 10/2005 | Safadi et al. |
| 6,973,665 B2 | 12/2005 | Dudkiewicz et al. |
| 6,983,478 B1 | 1/2006 | Grauch et al. |
| 7,010,497 B1 | 3/2006 | Nyhan et al. |
| 7,020,652 B2 | 3/2006 | Matz et al. |
| 7,051,352 B1 | 5/2006 | Schaffer |
| 7,055,165 B2 | 5/2006 | Connelly |
| 7,069,228 B1 | 6/2006 | Rose et al. |
| 7,109,985 B2 | 9/2006 | Spencer et al. |
| 7,120,591 B1 | 10/2006 | Solomon et al. |
| 7,131,134 B2 | 10/2006 | Trovato et al. |
| 7,143,066 B2 | 11/2006 | Shear et al. |
| 7,143,160 B2 | 11/2006 | Tamaki |
| 7,146,626 B1 | 12/2006 | Arsenault et al. |
| 7,152,237 B2 | 12/2006 | Flickinger et al. |
| 7,159,175 B2 | 1/2007 | Ishii et al. |
| 7,165,041 B1 | 1/2007 | Guheen et al. |
| 7,171,677 B1 | 1/2007 | Ochiai |
| 7,181,445 B2 | 2/2007 | Bebo et al. |
| 7,188,355 B1 | 3/2007 | Prokopenko et al. |
| 7,188,356 B1 | 3/2007 | Miura et al. |
| 7,200,853 B2 | 4/2007 | Kawai |
| 7,204,025 B2 | 4/2007 | Ziegs et al. |
| 7,213,027 B1 | 5/2007 | Kominek et |
| 7,231,607 B2 | 6/2007 | Neely et al. |
| 7,239,779 B2 | 7/2007 | Little |
| 7,240,025 B2 | 7/2007 | Stone et al. |
| 7,249,059 B2 | 7/2007 | Dean et al. |
| 7,254,829 B1 | 8/2007 | Brown et al. |
| 7,263,270 B2 | 8/2007 | Lapstun et al. |
| 7,263,709 B1 | 8/2007 | Krapf |
| 7,266,733 B2 | 9/2007 | Bazinet et al. |
| 7,284,064 B1 | 10/2007 | Connelly |
| 7,292,723 B2 | 11/2007 | Tedesco et al. |
| 7,304,685 B2 | 12/2007 | Park et al. |
| 7,312,772 B2 | 12/2007 | Kim |
| 7,315,983 B2 | 1/2008 | Evans et al. |
| 7,319,976 B1 | 1/2008 | Peckover |
| 7,340,457 B1 | 3/2008 | Killian et al. |
| 7,343,157 B1 | 3/2008 | Mitchell |
| 7,343,354 B2 | 3/2008 | Hennessey |
| 7,398,541 B2 | 7/2008 | Bennington et al. |
| 7,421,467 B2 | 9/2008 | Kaneko et al. |
| 7,421,724 B2 | 9/2008 | Klosterman et al. |
| 7,428,555 B2 | 9/2008 | Yan |
| 7,434,160 B2 | 10/2008 | Peiro et al. |
| 7,440,674 B2 | 10/2008 | Plotnick et al. |
| 7,441,260 B1 | 10/2008 | Kurapati |
| 7,444,658 B1 | 10/2008 | Matz et al. |
| 7,464,344 B1 | 12/2008 | Carmichael et al. |
| 7,469,943 B2 | 12/2008 | Hiramoto |
| 7,480,701 B2 | 1/2009 | Smith et al. |
| 7,487,529 B1 | 2/2009 | Orlick |
| 7,493,641 B2 | 2/2009 | Klosterman et al. |
| 7,496,943 B1 | 2/2009 | Goldberg et al. |
| 7,499,628 B2 | 3/2009 | Yuen et al. |
| 7,500,202 B2 | 3/2009 | Gerba et al. |
| 7,503,058 B2 | 3/2009 | Van Horck |
| 7,508,942 B2 | 3/2009 | Candelore |
| 7,509,580 B2 | 3/2009 | Sezan et al. |
| 7,533,034 B2 | 5/2009 | Laurin et al. |
| 7,542,657 B2 | 6/2009 | Yuen et al. |
| 7,552,458 B1 | 6/2009 | Finseth et al. |
| 7,564,369 B1 | 7/2009 | Adams et al. |
| 7,631,329 B1 | 12/2009 | Yamada |
| 7,644,425 B2 | 1/2010 | Parker et al. |
| 7,653,603 B1 | 1/2010 | Holtkamp, Jr. et al. |
| 7,668,950 B2 | 2/2010 | Horowitz et al. |
| 7,685,019 B2 | 3/2010 | Collins |
| 7,698,719 B2 | 4/2010 | Evans et al. |
| 7,752,073 B2 | 7/2010 | Barry et al. |
| 7,757,252 B1 | 7/2010 | Agasse |
| 7,774,341 B2 | 8/2010 | Aravamudan et al. |
| 7,797,168 B2 | 9/2010 | Kusumoto et al. |
| 7,814,421 B2 | 10/2010 | Reynolds et al. |
| 7,827,062 B2 | 11/2010 | Merriman et al. |
| 7,840,437 B2 | 11/2010 | Lewis |
| 7,844,985 B2 | 11/2010 | Hendricks et al. |
| 7,853,969 B2 * | 12/2010 | Smith et al. ..................... 725/22 |
| 7,873,972 B2 | 1/2011 | Zaslavsky et al. |
| 7,890,490 B1 | 2/2011 | Bovenschulte et al. |
| 7,904,814 B2 | 3/2011 | Errico et al. |
| 7,904,922 B1 | 3/2011 | Haberman et al. |
| 7,930,207 B2 | 4/2011 | Merriman et al. |
| 7,937,725 B1 | 5/2011 | Schaffer et al. |
| 7,970,648 B2 | 6/2011 | Gailey et al. |
| 7,992,068 B2 | 8/2011 | Chen et al. |
| 7,996,864 B2 | 8/2011 | Yuen et al. |
| 8,001,487 B2 | 8/2011 | Koppert |
| 8,032,414 B2 | 10/2011 | Payne et al. |
| 8,032,835 B1 | 10/2011 | Clevenger et al. |
| 8,032,853 B2 | 10/2011 | Awashima |
| 8,056,099 B2 | 11/2011 | Shanks et al. |
| 8,091,031 B2 | 1/2012 | Evans |
| 8,341,550 B2 | 12/2012 | De Heer et al. |
| 8,359,616 B2 | 1/2013 | Rosenberg et al. |
| 2001/0034654 A1 | 10/2001 | Vigil et al. |
| 2002/0010926 A1 | 1/2002 | Lee |
| 2002/0036654 A1 | 3/2002 | Evans et al. |
| 2002/0042921 A1 | 4/2002 | Ellis |
| 2002/0049975 A1 | 4/2002 | Thomas et al. |
| 2002/0059094 A1 | 5/2002 | Hosea et al. |
| 2002/0059621 A1 | 5/2002 | Thomas et al. |
| 2002/0067376 A1 | 6/2002 | Martin et al. |
| 2002/0087986 A1 | 7/2002 | Markel |
| 2002/0178446 A1 | 11/2002 | Sie et al. |
| 2002/0194591 A1 | 12/2002 | Gargi |
| 2003/0051238 A1 | 3/2003 | Barone, Jr. |
| 2003/0084441 A1 | 5/2003 | Hunt |
| 2003/0084446 A1 | 5/2003 | Thurston et al. |
| 2003/0097657 A1 | 5/2003 | Zhou et al. |
| 2003/0103088 A1 | 6/2003 | Dresti et al. |
| 2003/0115597 A1 | 6/2003 | Yassin et al. |
| 2003/0131355 A1 | 7/2003 | Berenson et al. |
| 2003/0135464 A1 | 7/2003 | Mourad et al. |
| 2003/0145323 A1 | 7/2003 | Hendricks et al. |
| 2003/0171991 A1 | 9/2003 | Robbins |
| 2003/0204846 A1 | 10/2003 | Breen et al. |
| 2003/0204854 A1 | 10/2003 | Blackketter et al. |
| 2004/0039648 A1 | 2/2004 | Candelore et al. |
| 2004/0070593 A1 | 4/2004 | Neely et al. |
| 2004/0078809 A1 | 4/2004 | Drazin |
| 2004/0184548 A1 | 9/2004 | Kerbiriou et al. |
| 2004/0194128 A1 | 9/2004 | McIntyre et al. |
| 2004/0255336 A1 | 12/2004 | Logan et al. |
| 2004/0261112 A1 | 12/2004 | Hicks, III et al. |
| 2004/0268413 A1 | 12/2004 | Reid et al. |
| 2005/0010531 A1 | 1/2005 | Kushalnagar et al. |
| 2005/0018079 A1 | 1/2005 | Van Der Vleuten |
| 2005/0021761 A1 | 1/2005 | Thomas |
| 2005/0063677 A1 | 3/2005 | Kosako et al. |
| 2005/0155067 A1 | 7/2005 | McKenna, Jr. |
| 2005/0160468 A1 | 7/2005 | Rodriguez |
| 2005/0172314 A1 | 8/2005 | Krakora et al. |
| 2005/0203943 A1 | 9/2005 | Su et al. |
| 2006/0015911 A1 | 1/2006 | Dean |
| 2006/0039481 A1 | 2/2006 | Shen et al. |
| 2006/0059277 A1 | 3/2006 | Zito et al. |
| 2006/0085828 A1 | 4/2006 | Dureau et al. |
| 2006/0101338 A1 | 5/2006 | Kates |
| 2006/0125962 A1 | 6/2006 | Shelton et al. |
| 2006/0218583 A1 | 9/2006 | Vanparijs et al. |
| 2006/0230417 A1 | 10/2006 | Van Horck |
| 2006/0282852 A1 | 12/2006 | Purpura et al. |

(56) References Cited

U.S. PATENT DOCUMENTS

| | | |
|---|---|---|
| 2007/0011702 A1 | 1/2007 | Vaysman |
| 2007/0016925 A1 | 1/2007 | Vaysman et al. |
| 2007/0044127 A1 | 2/2007 | Vaysman et al. |
| 2007/0070218 A1 | 3/2007 | Meijer et al. |
| 2007/0113257 A1 | 5/2007 | Takemoto |
| 2007/0144090 A1 | 6/2007 | Nguyen |
| 2007/0157248 A1 | 7/2007 | Ellis |
| 2007/0174286 A1 | 7/2007 | Seitz et al. |
| 2007/0204302 A1 | 8/2007 | Calzone |
| 2007/0214470 A1 | 9/2007 | Glasgow et al. |
| 2007/0214478 A1 | 9/2007 | Feldstein et al. |
| 2007/0234388 A1 | 10/2007 | King |
| 2008/0002580 A1 | 1/2008 | Kawada et al. |
| 2008/0059312 A1 | 3/2008 | Gern et al. |
| 2008/0092182 A1 | 4/2008 | Conant |
| 2008/0154803 A1 | 6/2008 | Stein et al. |
| 2008/0183577 A1 | 7/2008 | Evans |
| 2008/0196071 A1 | 8/2008 | Manthoulis |
| 2008/0275786 A1 | 11/2008 | Gluck |
| 2008/0282290 A1 | 11/2008 | Malik et al. |
| 2009/0055268 A1 | 2/2009 | Knoller et al. |
| 2009/0158337 A1 | 6/2009 | Stiers et al. |
| 2009/0259957 A1 | 10/2009 | Slocum et al. |
| 2009/0287610 A1 | 11/2009 | Bradshaw et al. |
| 2010/0017820 A1 | 1/2010 | Thevathasan et al. |
| 2010/0153983 A1 | 6/2010 | Philmon et al. |
| 2010/0205562 A1 | 8/2010 | de Heer |
| 2010/0324997 A1 | 12/2010 | Evans |
| 2011/0093878 A1* | 4/2011 | Falcon ............................ 725/14 |
| 2011/0110515 A1 | 5/2011 | Tidwell et al. |
| 2011/0125586 A1 | 5/2011 | Evans |
| 2011/0138327 A1 | 6/2011 | Scott et al. |
| 2011/0202960 A1 | 8/2011 | Vaysman et al. |
| 2011/0209173 A1 | 8/2011 | Vaysman et al. |
| 2011/0209179 A1 | 8/2011 | Vaysman et al. |
| 2011/0225591 A1 | 9/2011 | Wada et al. |
| 2011/0225612 A1 | 9/2011 | Vaysman et al. |
| 2011/0265120 A1 | 10/2011 | Vaysman et al. |
| 2011/0296467 A1 | 12/2011 | Vaysman et al. |
| 2011/0307925 A1 | 12/2011 | Vaysman et al. |
| 2011/0314501 A1 | 12/2011 | Vaysman et al. |
| 2012/0011544 A1 | 1/2012 | Vaysman et al. |
| 2012/0072952 A1 | 3/2012 | Vaysman et al. |
| 2012/0254910 A1* | 10/2012 | Donoghue et al. .............. 725/14 |

FOREIGN PATENT DOCUMENTS

| | | |
|---|---|---|
| EP | 1193976 | 4/2002 |
| EP | 1280343 | 1/2003 |
| EP | 1423794 | 6/2004 |
| FR | 2836321 | 8/2003 |
| GB | 2375674 | 11/2002 |
| WO | WO0237840 | 5/2002 |
| WO | WO0245304 | 6/2002 |
| WO | WO02102079 | 12/2002 |
| WO | WO03054678 | 7/2003 |
| WO | WO2005107245 | 11/2005 |
| WO | WO2006018825 | 2/2006 |
| WO | WO2006055243 | 5/2006 |

OTHER PUBLICATIONS

PCT Search Report for PCT/US2006/003420, dated Apr. 3, 2008.
PCT Search Report for PCT/US2012/38328, dated Aug. 9, 2012.
PCT Search Report for PCT/US2012/39280, dated Aug. 13, 2012.
PCT Search Report for PCT/US2012/39683, dated Aug. 10, 2012.
PCT Patentability Report for PCT/US12/40683, dated Aug. 9, 2012.
PCT Patentability Report for PCT/US12/41154, dated Aug. 14, 2013.
PCT Search and Patentability Report for PCT/US2012/032323, dated Jun. 19, 2012.
PCT Search and Patentability Report for PCT/US2014/057375, dated Dec. 24, 2014.
EP Search Report for PCT/US2012040683, dated Aug. 27, 2014.
PCT Search Report for PCT/US2013/053894, dated Feb. 10, 2015.

* cited by examiner

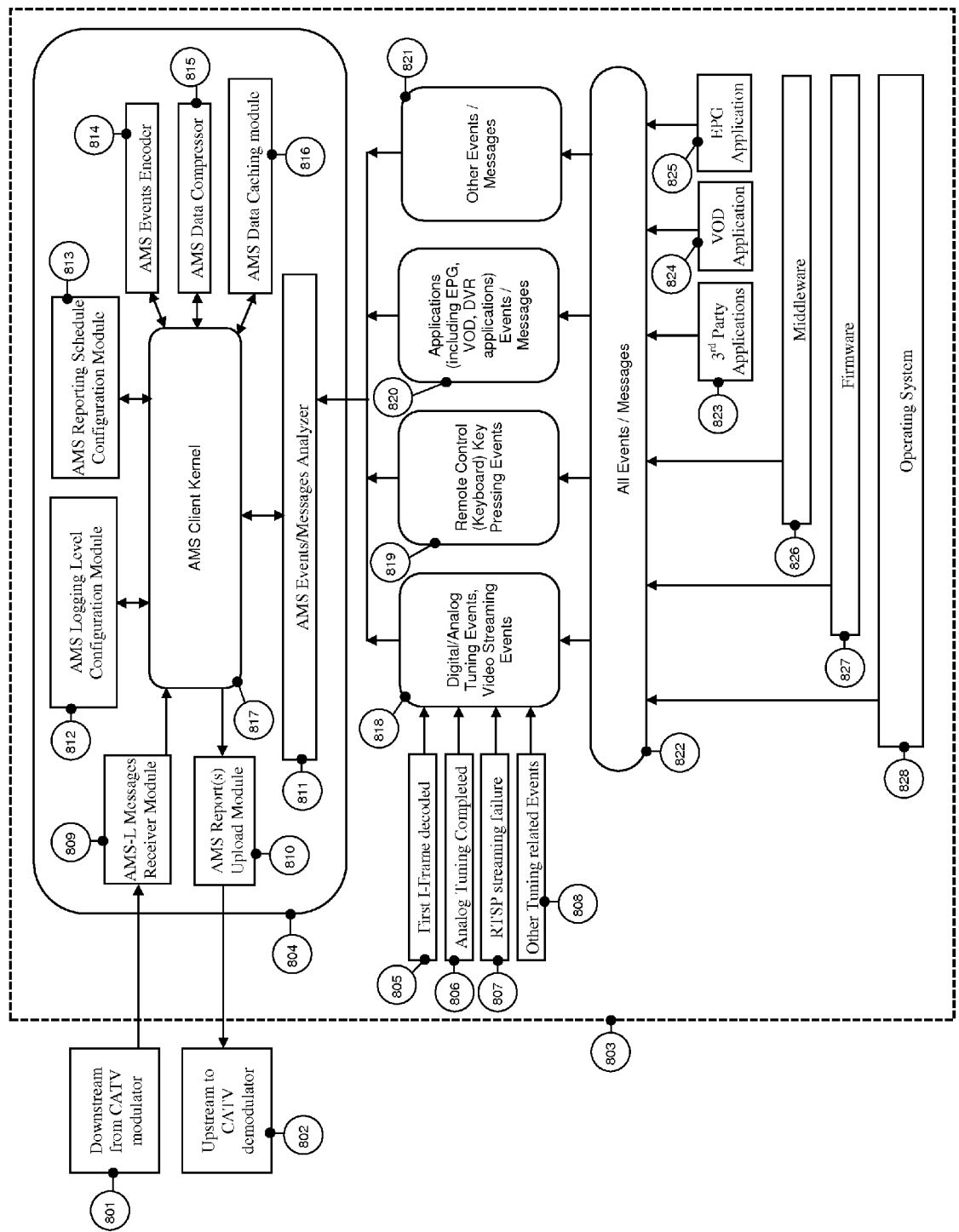

HIGHLY SCALABLE AUDIENCE MEASUREMENT SYSTEM WITH CLIENT EVENT PRE-PROCESSING

REFERENCE TO RELATED APPLICATIONS

This application claims priority to U.S. provisional Application Ser. No. 61/490,259, filed May 26, 2011, entitled "Highly Scalable Audience Measurement System with Client Event Pre-Processing," which is hereby specifically and entirely incorporated by reference.

BACKGROUND

1. Field of the Invention

The invention is directed to television advertisements. Specifically, the invention is directed to measuring television (TV) advertisement (ad or commercial) viewership.

2. Background of the Invention

To generate accurate ad viewership information for all ad types, a client device based Audience Measurement System (AMS), which logs events on a client device, has collect, transport, store, retrieve, and process an amount of data that can easily exceed the capabilities of existing cost-effective systems. For example, for the PayTV industry in the United States (where there are approximately 60 million digital TV subscribers), if each subscriber generates, on average, approximately one hundred events per day, a typical AMS will need to generate, transport, and store approximately six billion events per day. To generate a program or ad rating report, such a system, will have to process the six billion records per day of data for each report. Such an amount of data makes existing AMS systems impractical for monitoring every viewer.

Moreover, considering that a typical linear channel lineup in the US has approximately 300 channels and each hour of broadcasted programming has up to 22 minutes allocated for ad spots (which are typically 30 seconds or less), in all, there are up to 316,800 ad units per day which need to be mapped to about 1,000 socioeconomic, demographic, purchasing, housing, and other profiles.

To date, none of the existing AMS have been created for the PayTV industry, within a reasonable budget, because they have not overcome the limitations caused by the set-top-box return path (i.e. the set-top-box's upstream bandwidth to the head-end), the speed of data retrieval from centralized storage, the cost of CPU data processing to generate the necessary reports, and the time necessary to complete the requested reports (with 316,800 ad units, six billion US records per user per day, and 0.01 millisecond per one comparison, report generation can take up to 602 years to process on a modern computer).

SUMMARY OF THE INVENTION

The present invention overcomes the problems and disadvantages associated with current strategies and designs and provides new tools and methods of measuring viewership.

One embodiment is directed to a method of reporting Audience Measurement System (AMS) viewership events on a client device. The method comprises the steps of receiving at least one event message on a client device, processing the at least one event message on the client device to create an AMS viewership report, and transmitting the AMS viewership report. Each event message is a data signal indicates an occurrence of an event.

Preferably, each event is at least one of streaming a video, a remote control key press, an application messages, an indication of a first I-frame decoded, analog or digital tuning completed, and an RTSP (Real Time Streaming Protocol) streaming failure. In the preferred embodiment, an event is a remote control key press and the step of processing the least one event message on the client device comprises determining if an I-Frame is decoded.

The client device is preferably one of a TV viewing system, a personal computer, a tablet computer, a smartphone, a game console, a radio receiver, an MP3 player, a streaming media device, or set top box. Preferably, the client device is a home appliance. The step of processing the least one event message on the client device preferably comprises analyzing the sequence or timing of received messages in accordance with built-in algorithms and generating accurate AMS viewership event data.

The method preferably further comprises collecting additional data from the client device and estimating the event that took place on a device in communication with the client device. The method preferably further comprises analyzing sequence and timing of event messages with algorithms. The report is preferably transmitted to a backend.

Another embodiment of the invention is directed to a system for reporting Audience Measurement System (AMS) viewership events on a client device. The system comprises a client device processor, an input/output device in communication with the client device processor, a transceiver in communication with the client device processor, and software executing on the client device processor. The software receives at least one event message on a client device, wherein each event message is a data signal indicating an occurrence of an event, processes the at least one event message on the client device to create an AMS viewership report, and transmits the AMS viewership report.

In the preferred embodiment, each event is at least one of a tuning event, a video streaming events, a remote control key press, an applications messages, first I frame decoded, analog tuning completed, and RTSP (Real Time Streaming Protocol) streaming failure. Preferably, an event is a remote control key press and the software further determines if an I-Frame is decoded.

The client device is preferably one of a TV viewing system, a personal computer, a tablet computer, a smartphone, a game console, a radio receiver, an MP3 player, a streaming media device or set top box. The client device can be a home appliance. The software preferably analyzes the sequence or timing of received messages in accordance with built-in algorithms and generates accurate AMS viewership event data.

The software preferably further collects additional data from the client device and determining the event that took place on a device in communication with the client device. The software preferably analyzes sequence and timing of event messages with algorithms. The AMS viewership events report is preferably transmitted to a backend.

Other embodiments and advantages of the invention are set forth in part in the description, which follows, and in part, may be obvious from this description, or may be learned from the practice of the invention.

DESCRIPTION OF THE DRAWING

The invention is described in greater detail by way of example only and with reference to the attached drawing, in which:

FIG. 1 depicts an embodiment of AMS-A architecture and communication signal data flow.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention A problem in the art capable of being solved by the embodiments of the present invention is measuring TV viewership. Typically, TV viewership is measured by logging events generated by software modules in real-time running on a client device and then sending them to a processing unit (backend) for offline processing. The processing unit analyzes client device logging events offline and generates AMS viewership events which are then incorporated into AMS reports. Examples of AMS viewership events are: the time interval a viewer started and finished watching a particular advertisement, and the time interval a viewer started and finished watching a particular program. While AMS viewership events represent viewership of a particular viewer, typical AMS report represents viewership of a group of viewers. The group of viewers can be selected using one of several criteria which can include: demographic profile, socio-economic profile, purchasing history profile and others.

It has been surprisingly discovered that AMS viewership events can be generated on a client device in real-time by logging and analyzing events generated by software modules. By generating AMS viewership events on a client device, AMS software client module has an opportunity to request and receive in real-time additional information needed from other software modules running on a client device to make an accurate determination of a viewership event. Existing AMS systems, which generate AMS viewership events offline, cannot request and receive additional information needed to make an accurate determination of a viewership event. This results in lower accuracy of AMS viewership events generated by existing systems.

The present invention, by pre-processing event data on the client device, results in significant reduction in upstream traffic from a client device to backend processing unit, and significant reduction in processing power needed by a backend to generate AMS viewership events and generate AMS viewership reports.

The present invention allows AMS to collect data and create cost-effective, census level accuracy AMS viewership reports. In the preferred embodiment the AMS is comprised of several tiers of distributed computing components residing at different typological network points within the content distribution system to enable cost-effective processing of large amount of collected data. Tier 1 is comprised of AMS-A, Tier 2 of AMS-L, Tier 3 AMS-C. AMS-A is an AMS client application which resides in video playback device, e.g TV set, set top box, video streaming adapter. AMS-L is a backend server based sub-system which acts as a first collecting and pre-processing point for the data generated by AMS-A components. After data pre-processing is completed, AMS-L sends data to AMS-C. AMS-C is a backend server based sub-system which acts as a last data processing prior to data being archived and exported to ad agencies. Depending on content distribution network topology and scale, locations and total number of AMS-L components would vary. For example, small content distribution system would only have AMS-A and AMS-L components and utilize AMS-C component located outside of that particular content distribution network.

Each AMS-A (client device level) is preferably responsible for receiving configuration messages from the AMS-L and executing the logging, processing, and report of events in accordance with the received configuration messages. Each AMS-A is preferably a software module residing on a client's set top box, TV, computer, tablet, smartphone, streaming media device, or other media playing device.

Each AMS-L (local node level) is preferably responsible for receiving panel definitions, subscriber profile information, and program and ad schedules from the AMS-C, a TV Traffic System, an Electronic Program Guide Server, and/or a Video-on-Demand server. The AMS-L is also preferably responsible for sending configuration messages to each AMS-A and performing upstream bandwidth optimization. The AMS-L is also preferably responsible for receiving reports from each AMS-A, merging panel reports, and sending requested reports to the AMS-C for further merging. Each AMS-L is preferably maintained by a media service provider such as a cable company, a satellite TV company, a streaming media company, or an internet service provider.

The AMS-C (central level) is preferably responsible for receiving panel definitions from ad agencies, subscriber demographics and socioeconomic metadata from source agencies, programming metadata from national broadcasters, and ad schedules from ad agencies or broadcasters. The AMC-C is preferably responsible for merging requested information and mapping the information into available AMS-L subscriber bases. The AMS-C can receive and merge reports from multiple AMS-Ls. An AMS-C is preferably maintained by a media company such as a broadcaster, a cable TV channel, or an internet web-page.

FIG. 1 depicts an embodiment of AMS-A architecture and communication signal and data flow. Client device 803 preferably contains AMS-A components module 804. AMS-A module 804 may consist of the following components: AMS-L messages receiver module 809, AMS report upload module 810, AMS logging level configuration module 812, AMS reporting schedule configuration module 813, AMS events encoder 814, AMS data compressor 815, AMS data caching module 816, and AMS client kernel 817. AMS-L receive module gets panel configuration message downstream from CATV modulator 801 from an AMS-L sub-system. The client device preferably includes a central processing unit, memory, and software stack comprised of operating system 828, firmware 827, middleware 826, $3^{rd}$ party applications 823, VOD application 824, and EPG application 825. All these software modules generate events and messages 822 which may consist of the following categories: digital/analog tuning events, video streaming events 818, remote control key pressing events 819, applications events/messages 820, or other events/message 821. Events in category 818 preferably consists of the following sub-category events: first I frame decoded event 805, analog tuning completed event 806, RTSP (Real Time Streaming Protocol) streaming failure event 807, and other tuning related events 808.

AMS-A module 811 collects the various types of events and can generate, log-in, and transmit an event, with a high degree of accuracy, which preferably represents the viewer experience in consuming various types of content, including, but not limited to: linear programming, ad spots, interactive TV applications, video-on-demand (VOD) content, pay-perview events, and digital video recorder (DVR) events (e.g. fast forward, 30 second skip, and 7 second rewind).

For example, when a viewer pressed the channel UP key on the remote control multiple times while that viewer is browsing digital channels, the AMS-A system will only log events when the first "I-frame" is actually decoded. In existing AMS, on the other hand, log all channel UP key presses, which often leads to misleading reports since, in many cases, a viewer does not see any video from a "quickly" skipped channel.

Module 811 receives event messages created by the modules outside of module 804. Module 811 then analyzes sequence and timing of received messages in accordance with built-in algorithms to generate accurate and actual events which correspond to the viewer experience on a TV screen. In the event Module 811 does not have sufficient information to accurately determine AMS viewership event, Module 811 can request and receive additional information from other client device modules. Module 811 stores the generated AMS viewership events in AMS data caching module 816 for further transport through AMS client kernel 817 to AMS reports upload module 810 for transmission to CATV demodulator 802.

Module 811 preferably collects all possible information from within client device 803 to generate with negligible margins of error AMS viewership events that took place on a TV set connected to the client device.

While the examples provided herein are for TV viewing systems, the invention is also applicable to other video and audio applications involving an audience, including, but not limited to, video viewing on PCs, tablets, smart phones, game consoles, radio receivers, MP3 players, and other streaming and linear programming devices. Furthermore, the invention is equally applicable to the monitoring of other electronic devices in the environment of an audience member, such as other home appliances.

Although the exemplary environment described herein employs a hard disk database, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Networks may include the Internet, one or more Local Area Networks ("LANs"), one or more Metropolitan Area Networks ("MANs"), one or more Wide Area Networks ("WANs"), one or more Intranets, etc. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:
1. A method of reporting Audience Measurement System (AMS) viewership events on a client device, comprising a client device:
  receiving a plurality of event messages from multiple sources coupled to the client device, wherein each event message is a data signal indicating an occurrence of an event;

processing the sequence and timing of each of the plurality of event messages;

determining if the sequence and timing of each of the plurality of event messages accurately reflects a viewership event;

requesting additional information from at least one of the multiple sources coupled to the client device if the client device determines there is not a required amount of information to accurately reflect a viewership event;

recording each of the viewership events to create an AMS viewership report; and transmitting the AMS viewership report.

2. The method of claim 1, wherein each event message is at least one of streaming a video, a remote control key press, an application messages, an indication of a first I-frame decoded, analog or digital tuning completed, and an RTSP (Real Time Streaming Protocol) streaming failure.

3. The method of claim 2, wherein at least one event message is a remote control key press and at least one event message is an indication that a first I-Frame is decoded.

4. The method of claim 1, wherein the client device is one of a TV viewing system, a personal computer, a tablet computer, a smartphone, a game console, a radio receiver, an MP3 player, a streaming media device, or set top box.

5. The method of claim 1, wherein the client device is a home appliance.

6. The method of claim 1, wherein the step of processing the sequence and timing of each of the plurality of event messages on the client device comprises analyzing the sequence or timing of received messages in accordance with built-in algorithms.

7. The method of claim 1, wherein the AMS viewership report includes only events corresponding with a second event.

8. The method of claim 1, wherein the report is transmitted to a backend.

9. A system for reporting Audience Measurement System (AMS) viewership events on a client device, comprising:

a client device processor:

an input/output device in communication with the client device processor;

a transceiver in communication with the client device processor; and software executing on the client device processor, wherein the software:

receives a plurality of event messages from multiple sources coupled to the client device, wherein each event message is a data signal indicating an occurrence of an event;

processes the sequence and timing of each of the plurality of event messages;

determines if the sequence and timing of each of the plurality of event messages accurately reflects a viewership event;

requests additional information from at least one of the multiple sources coupled to the client device if the client device determines there is not a required amount of information to accurately reflect a viewership event;

records each of the viewership events to create an AMS viewership report; and transmits the AMS viewership report.

10. The system of claim 9, wherein each event message is at least one of a tuning event, a video streaming events, a remote control key press, an applications messages, first I frame decoded, analog tuning completed, and RTSP (Real Time Streaming Protocol) streaming failure.

11. The system of claim 10, at least one event message is a remote control key press and at least one event message is an indication that a first I-Frame is decoded.

12. The system of claim 9, wherein the client device is one of a TV viewing system, a personal computer, a tablet computer, a smartphone, a game console, a radio receiver, an MP3 player, a streaming media device or set top box.

13. The system of claim 9, wherein the client device is a home appliance.

14. The system of claim 9, wherein the software analyzes the sequence or timing of received messages in accordance with built-in algorithms.

15. The system of claim 9, wherein the AMS viewership report includes only events corresponding with a second event.

16. The system of claim 9, wherein the AMS viewership events report is transmitted to a backend.

* * * * *